United States Patent
Gorshe

(10) Patent No.: US 8,028,824 B2
(45) Date of Patent: Oct. 4, 2011

(54) REPLACEMENT ROLLER ASSEMBLY

(75) Inventor: Stephen J. Gorshe, Bellaire, OH (US)

(73) Assignee: Hallen Specialties, Inc., Spring Grove, IL (US)

( * ) Notice: Subject to any disclaimer, the term of this patent is extended or adjusted under 35 U.S.C. 154(b) by 244 days.

(21) Appl. No.: 12/466,964

(22) Filed: May 15, 2009

(65) Prior Publication Data

US 2009/0255785 A1    Oct. 15, 2009

Related U.S. Application Data

(60) Provisional application No. 61/106,796, filed on Oct. 20, 2008.

(51) Int. Cl.
*B65G 15/08* (2006.01)
(52) U.S. Cl. .......................... 198/842; 198/619
(58) Field of Classification Search .......... 198/824–830, 198/842, 619
See application file for complete search history.

(56) References Cited

U.S. PATENT DOCUMENTS

| | | | |
|---|---|---|---|
| 1,618,957 A | 2/1927 | Hunter | |
| 1,883,422 A | 10/1932 | Strong | |
| 2,437,499 A * | 3/1948 | Benjamin | 198/830 |
| 2,687,799 A * | 8/1954 | Saxe | 198/830 |
| 2,843,432 A * | 7/1958 | Kindig | 384/419 |
| 3,126,090 A * | 3/1964 | Bitzer | 198/824 |
| 3,545,601 A * | 12/1970 | Cressman | 198/830 |
| 3,545,602 A | 12/1970 | McCullagh | |
| 5,044,490 A * | 9/1991 | East | 198/830 |
| 5,988,360 A | 11/1999 | Mott | |
| 5,988,361 A | 11/1999 | Giacomin et al. | |
| 6,349,819 B1 * | 2/2002 | Nohl et al. | 198/830 |
| 6,427,828 B1 | 8/2002 | East et al. | |
| 6,543,607 B2 | 4/2003 | Fischer et al. | |
| 6,550,606 B2 * | 4/2003 | Tapp | 198/808 |
| 6,634,490 B2 | 10/2003 | Fischer et al. | |
| 7,467,707 B1 * | 12/2008 | Gabhart | 198/818 |
| 2004/0079621 A1 * | 4/2004 | Mott | 198/823 |
| 2009/0194394 A1 | 8/2009 | Croftcheck | |
| 2010/0072037 A1 * | 3/2010 | Jabber et al. | 198/842 |

FOREIGN PATENT DOCUMENTS

GB    2109327 A  *  6/1983

* cited by examiner

*Primary Examiner* — Mark A Deuble
(74) *Attorney, Agent, or Firm* — Barnes & Thornburg LLP

(57) ABSTRACT

A replacement roller support assembly allows repairing of a conveyor roller support system begins with removing at lease one system roller support from the system base. Next a replacement roller support assembly includes an assembly base with an opening and assembly roller support above each opening for each system roller support removed. The replacement roller support assembly is positioned with the opening and the assembly roller support aligned with the location of the removed roller supports of the system. The support assembly is secured to the system base and the roller is attached to the assembly roller support.

21 Claims, 5 Drawing Sheets

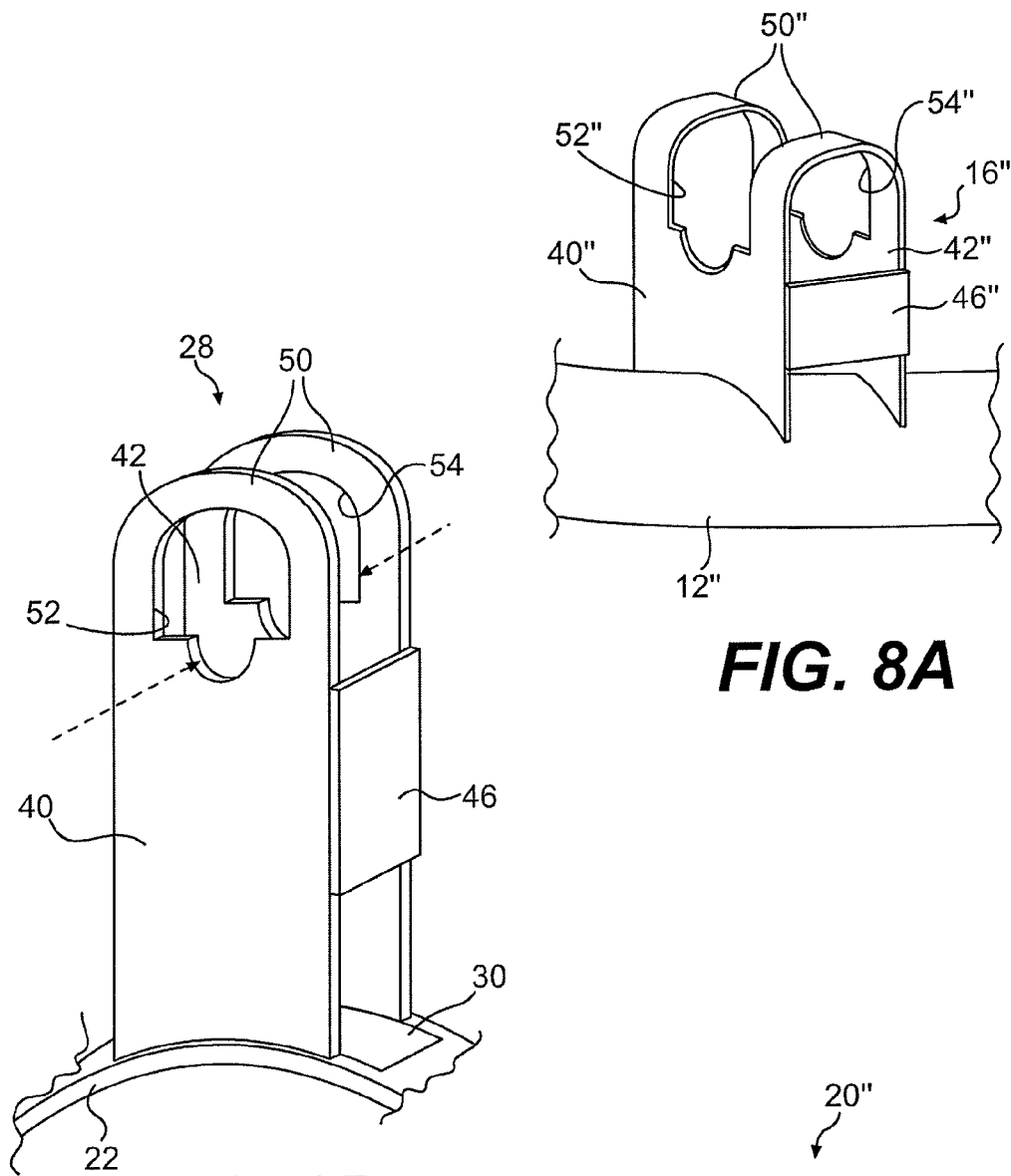
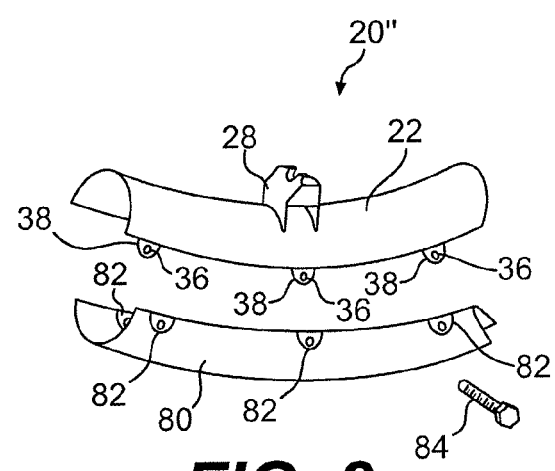

REPLACEMENT ROLLER ASSEMBLY

BACKGROUND AND SUMMARY OF THE INVENTION

The present invention relates to conveyor belt roller support systems and more specifically to the replacement roller support assembly.

Conveyor belts, for example, in mines rest on a series of idle rollers. The idle rollers in the conveyor belt roller support system are mounted to roller supports which are integral to a base. The bases are mounted on the ground or on frames or rails above the ground. Depending upon the type of conveyor, there may be two V shaped rollers between three supports or a horizontal roller between two to wing rollers between four supports. The roller supports are usually welded to the base.

In the mining industry, it is usually the interior or center roll of supports which are damaged. One of the general practices is to remove the whole conveyor belt roller support system. As one can imagine, in a mine this takes a lot of time and is very difficult. It requires moving a very large and heavy roller support system.

The present replacement roller support assembly allows repairing of a conveyor roller support system in an efficient manner. It begins with removing at lease one system roller support from the system base. Next a replacement roller support assembly includes an assembly base with an opening and assembly roller support above each opening for each system roller support removed. The replacement roller support assembly is positioned with the opening and the assembly roller support aligned with the location of the removed roller supports of the system. The support assembly is secured to the system base and the roller is attached to the assembly roller support.

The assembly base may be V-shaped or a portion of an arch of a circle in cross-section. The assembly base is secured to the system base by a fastener for example through legs of the assembly base or around the two bases.

The assembly base may include a pair of end members joined by a bridge and the end members each include an opening and assembly rollers support. The bridge may have a V-shaped cross section and the end member are also V shaped with parallel legs each extending from the end of the leg of the V. The parallel legs may include apertures receiving a fastener extending across the V. The apertures may be located on a portion of the leg spaced from a portion of the leg which is aligned with the opening. The assembly base may include one opening and assembly roller support centered on the assembly base.

The assembly roller support may include two end walls joined by two side walls. At least one of the end walls includes a recess and a top edge to receive a portion of the roller. A pair of top walls extends from a respective side wall and between the top edges of the end walls. The side walls may be truncated triangles and one of the end walls is inclined at angle to the other end wall. Both end walls may include a recessed and top edge to receive a portion the respective roller.

These and other aspects of the present invention will become apparent from the following detailed description of the invention, when considered in conjunction with accompanying drawings.

BRIEF DESCRIPTION OF THE DRAWINGS

FIGS. 8A and 8B are an enlarged perspective view of the system roller support and the assembly roller support respectively of FIG. 7.

FIG. 9 is a perspective view of another fastener for the roller support assembly and third type of conveyor belt roller support system.

DETAILED DESCRIPTION OF THE PREFERRED EMBODIMENTS

Figure 1:
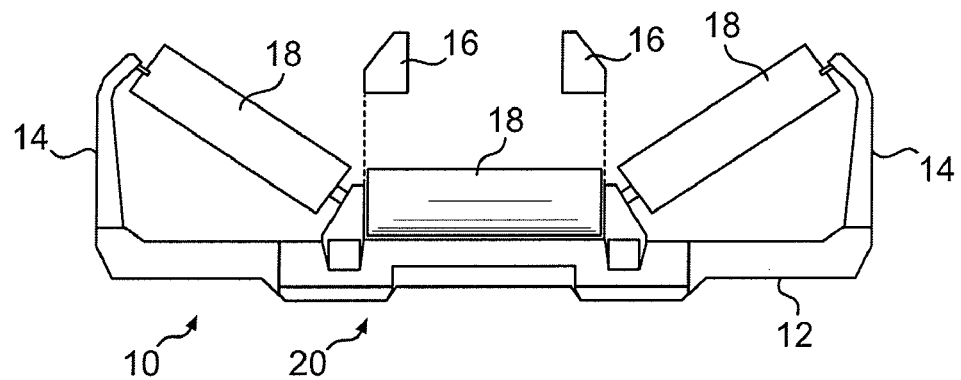
FIG. 1 is a side view of a first type of three roller conveyor belt roller support system with a first replacement roller support assembly of the present disclosure.

A first type of conveyor belt roller support system 10 is illustrated in FIG. 1. It includes a system base 12, a pair of outer roller supports 14 integral therewith. A pair of inner roller supports 16 are shown removed from their location from the system base 12. A first replacement roller support assembly 20 is shown mounted on the system base 12. Idle rollers 18 extend between the outer supports 14 and the replacement support assembly 20 and a center roller 18 is mounted to the replacement roller support assembly 20.

Figure 7:
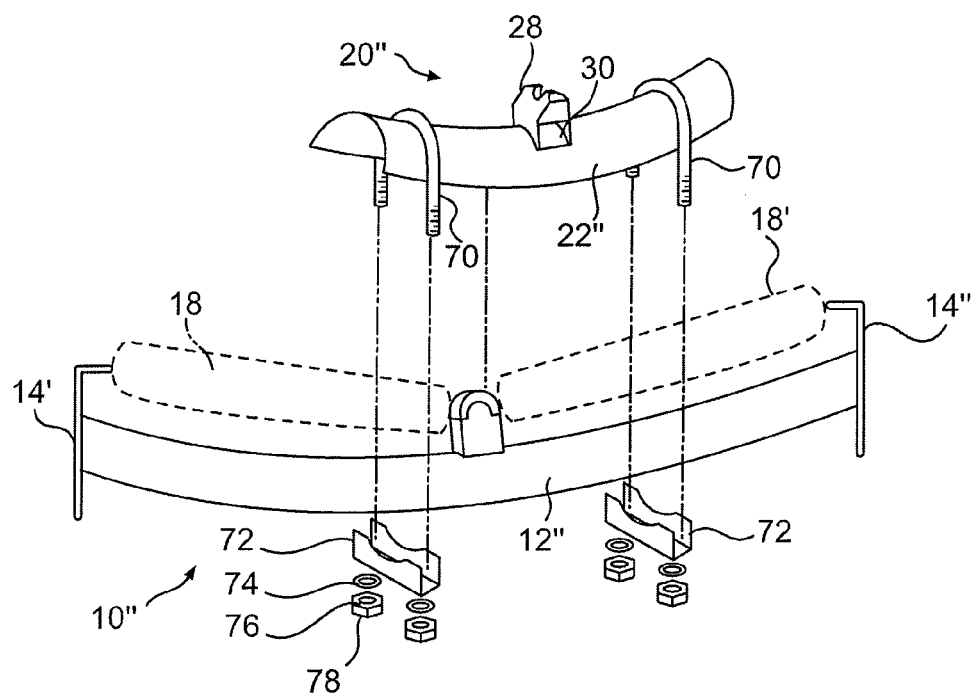
FIG. 7 is a perspective view of a third roller support assembly and a third type of two roller conveyor belt roller support system.

Although the replacement roller support assembly 20 in FIG. 1 is shown for a three-roller system, it can also be used in a two-roller system with appropriate modification as shown in FIGS. 7-9. The location from which the system roller supports are removed is illustrated by the remaining element or welds 17 illustrated in FIG. 4 on the system base 12.

The replacement roller support assembly 20 as illustrated in detail in FIGS. 2-5, includes an assembly base 22 on the system base 12. The assembly base 22 includes a pair of end portions 24 joined by a bridging portion 26. A pair of assembly roller supports 28, are integral to the assembly base 22 at end portions 24.

Although the assembly base 22 is shown as three separate pieces welded together it may be one single unit made from a single piece of metal and shaped as appropriate. Also on the bridge 26 can have the shape as the end portions 24.

Figure 3:
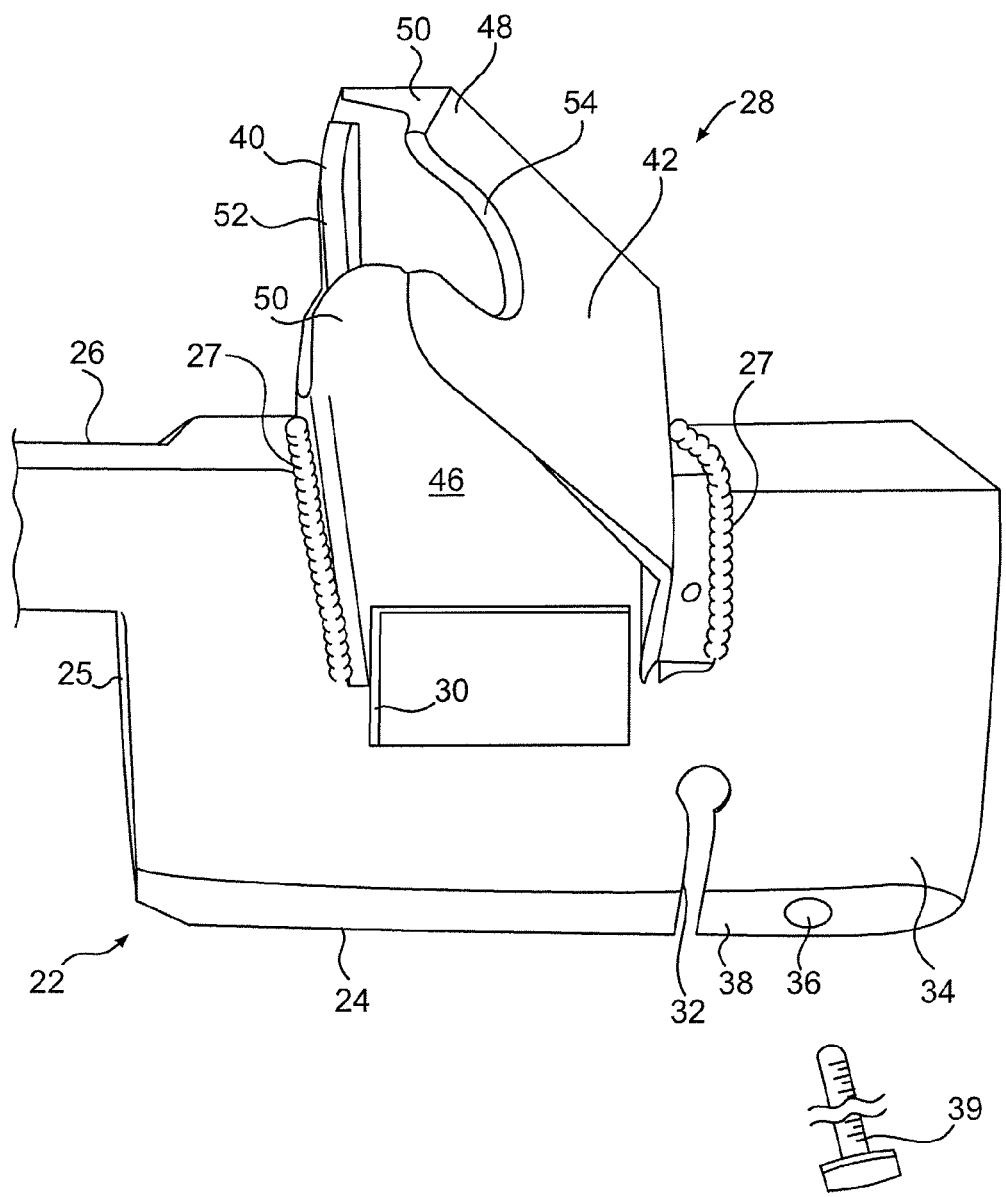
FIG. 3 is an enlarged perspective view of a portion of the replacement roller support assembly.
Figure 4:
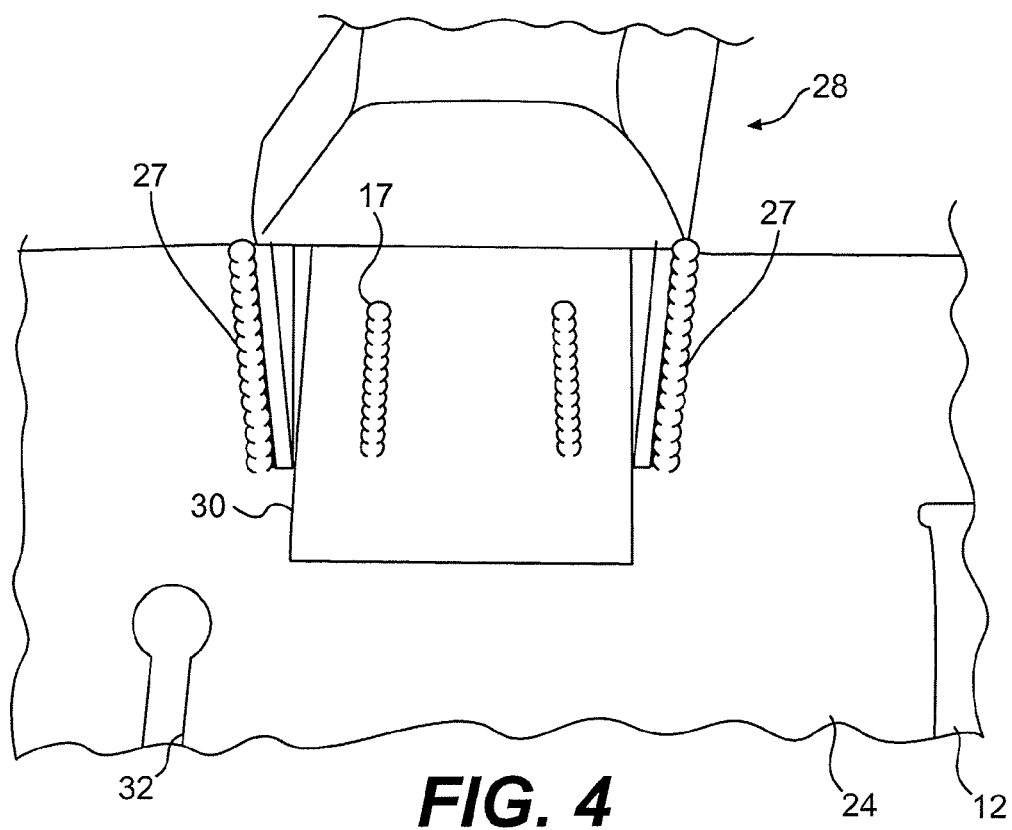
FIG. 4 is an enlarged side view of the replacement roller support assembly.

The roller supports 28 are shown welded at 27 in FIGS. 3 and 4 to end portion 24 of the assembly base 22. The assembly roller support 28 is positioned above an opening 30 in the base end portion 24. Both are aligned and overlap the position, shown by example the remaining element 17, in which the system roller supports 16 were removed. The opening 30 allows the base 22 to lie snuggly on the system base 12. If it did not lie snuggly the alignment of the ultimately attached rollers would be skewed.

A slot 32 in the base end portions 24 separates the portion 34 from the main body. The portion 34 is from the main body which includes the opening 30 and the assembly roller supports 28. The end portion 24 is shaped to conform to the base 12 of the support system. In the example shown in FIGS. 1 and 2, the support system base 12 is V-shaped and consequentially the base 22 of the assembly is V-shaped. As illustrated in FIG. 3, a pair of parallel legs 38 extends from the V-shape of the end portion 24 of the assembly base 22.

An aperture 36 is provided in the legs 38 to receive a fastener 39 which extends across the V to tighten and secure the replacement roller support assembly to the system base 12. Tightening of the fastener 39 in combination with the slot 32 allows the parallel legs 36 to flex if necessary for further securement. This is especially important because of the vibration set up in the use of the conveyor system. The fastener 39 is shown as a bolt, but may also be a cotter pin or other simple fastener or clamp.

Figure 2:
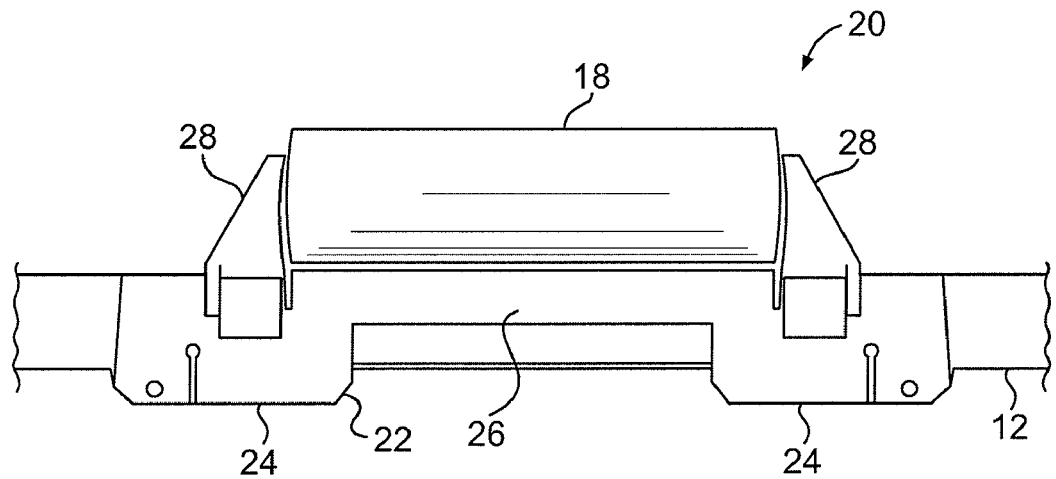
FIG. 2 is an enlarged portion of FIG. 1 showing the roller support assembly on conveyor belt roller support system.

The structure of roller supports 28, of the replacement roller support assembly of FIGS. 1 and 2, is illustrated in detail in FIG. 3. The assembly support 28 includes two end walls 40 and 42 joined by two side walls 46 and 48. The top edges of the walls are covered by a top 50. The front wall 40 includes a recess 52 to receive a portion of a roller and the rear wall 42 also includes a recess 54 to receive a portion of a roller.

The space between the end walls 40 and 42 are greater than the space between the ends walls of the system roller support 16 to accommodate any portion of the system roller support 16 remaining. To aid in alignment of the replacement roller support assembly 20 to the roller support system 10, the system roller support 16 is removed such as to leave a stub extending from the system base 12 into the openings 30 in the assembly base 22 after positioning the support assembly 20 on the support system 10.

In construction, the four walls 40, 42, 46, and 48 are each individually made and welded together. The top wall 50 may be an extension of the side wall and bent over prior to welding. As previously discussed the roller support 28 is welded at 27 to the end portion 24 of the assembly support.

Figure 5:
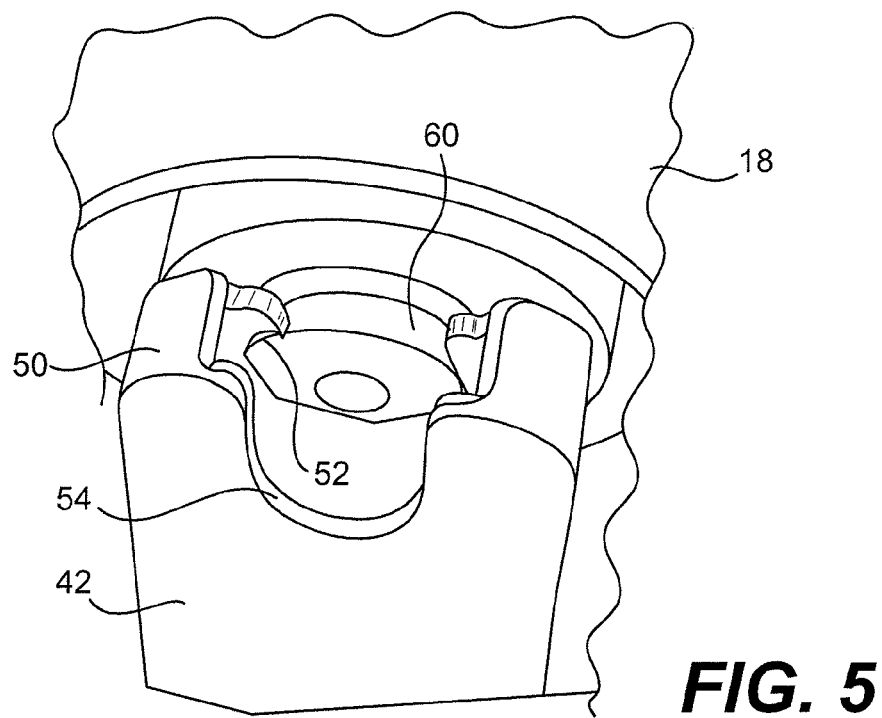
FIG. 5 is a perspective view of the connection of the roller to the assembly roller support.

As illustrated in FIG. 5, an axle 60 of the roller 18 received in recess 52 in the end wall 40.

Figure 6:
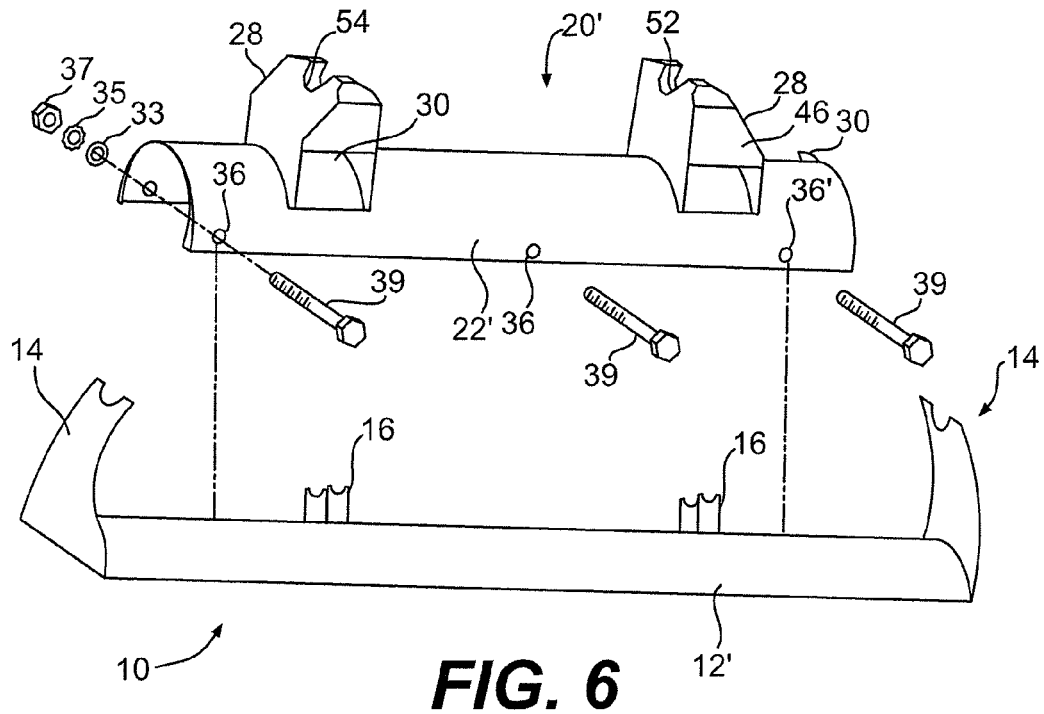
FIG. 6 is a perspective view of a second roller support assembly and the second type of three roller conveyor belt roller support system.

A second replacement roller support assembly 20' for a second type of conveyor belt roller support system 10 is illustrated in FIG. 6. the assembly base 12' is an arc. The replacement roller support assembly 20' includes an assembly base 22' which is an arc of a circle in cross-section. The assembly roller support 28 is positioned above an opening 30 in the end portions of the assembly base 22'. Both are aligned and overlap the position, shown by example the remaining element 17, in which the system roller supports 16 were removed. The remaining element or stub 17 extends from the system base into the openings in the assembly base after positioning the support assembly. This will limit movement of the assembly base 22' on the system base 12' rotationally and axially.

The assembly base 22' includes apertures 36 for receiving fasteners 39 to secure the assembly base 22' on the system base 12'. The fastener 39 is shown as a bolt with washer 33, lock washer 35, and nut 37.

A third replacement roller support assembly 20" for a third type of conveyor belt roller support system 10" is illustrated in FIG. 7. It includes a system base 12" and a pair of outer roller supports 14" integral therewith. An inner roller support 16" is centered on the system base 12". Rollers 18, shown in phantom, extend between the outer supports 14" and the inner support 16". In this system, the system base 12" is circular, for example a pipe welded to the side rails.

The replacement roller support assembly 20" includes an assembly base 22" which is an arc of a circle in cross-section. A single assembly roller support 28 is positioned above an opening 30 in the center portions of the assembly base 22". Both are aligned and overlap the position, shown by example the remaining element 17, in which the system roller support 16" was removed.

The diameter of the arc of the assembly base 22" is larger than the diameter of the arc of the system base 12". For example, the diameter of the arc of the assembly base 22" maybe 11¼ inches and the diameter of the arch of the system base 12" may be 10¾ inches. The remaining element or stub 17 extends from the system base into the opening 30 in the assembly base after positioning the support assembly. This will limit movement of the assembly base 22" on the system base 12" rotationally and axially.

The assembly base 22" is secured on the system base 12" by a fastener shown as a U-bolt clamp. A U-bolt 70 is secured to bracket 72 by washer 74, lock washer 76, and nut 78. An opening may be provided in the assembly base 22" to receive the clamp or U-bolt 70. This would limit any axial movement between the assembly base 22" and the clamp or U-bolt 70. Other clamps may be used, for example a ring or band clamp.

A detailed view of the system roller support 16" is shown in FIG. 8A and the assembly roller support 28 in FIG. 8B. Those elements having the same function include the same number. The system roller support 16' includes two end walls 40" and 42" joined by two side walls 46" and 48". The top edges of the end walls 40" and 42" are covered or joined by tops 50". The front wall 40" includes a recess 52" to receive a portion of a roller and the rear wall 42" also includes a recess 54" to receive a portion of a roller. The assembly support 28 includes two end walls 40 and 42 joined by two side walls 46 and 48. The top edges of the end walls 40 and 42 are covered by tops 50. The front wall 40 includes a recess 52 to receive a portion of a roller and the rear wall 42 also includes a recess 54 to receive a portion of a roller.

Another fastener for the replacement roller support assembly 20" is shown in FIG. 9. A arch of a circle cross-sectional clamp 80 is secured to the assembly base 22" by fasteners 84 extending through apertures 82 in the clamp 80 and into threaded apertures 36 in legs 38 of the assembly base 22".

Although the present invention has been described and illustrated in detail, it is to be clearly understood that the same is by way of illustration and example only, and is not to be taken by way of limitation. The scope of the present invention is to be limited only by the terms of the appended claims.

What is claimed:

1. A method of repairing a conveyor belt roller support system wherein the system includes at least one roller support integral to a system base, the method comprising:
    removing at least one system roller support from the system base;
    positioning a replacement roller support assembly on the system base wherein an opening in an assembly base and an assembly roller support above the opening for each system roller support removed are aligned with the location of the removed roller support;
    securing the assembly base to the system base; and
    attaching a roller to the assembly roller support;
    wherein the system roller support is removed such as to leave a stub extending from the system base into the opening in the assembly base after positioning the support assembly.

2. The method of claim 1, wherein system includes two roller supports on the system base, each of which are removed, and the roller support assembly includes two openings and corresponding assembly roller supports; and the roller is attached to and between the two assembly roller supports.

3. The method of claim 1, wherein assembly base is secured to the system base by a clamp.

4. The method of claim 1, wherein assembly base is secured to the system base by a fastener extending through a pair of holes each in a leg of the assembly base.

5. A replacement roller support assembly for a conveyor belt roller support system wherein the system includes a plurality of rollers and at least one damaged roller support integral to a system base, the assembly comprising:
   an assembly base shaped to rest on a top of the system base, the assembly base defining an opening for receiving said damaged system roller support when said assembly base rests on the top of the system base;
   an assembly roller support defining a recess for engaging one of the rollers, the assembly roller support and the recess disposed above said opening relative to said system base and above said system base such that the opening is disposed between said recess and said base when said assembly base rests on the top of the system base and such that recess and opening align with said damaged system roller support when said assembly base rests on the top of the system base.

6. The assembly of claim 5, wherein the assembly base includes a pair of end members joined by a bridge and wherein the assembly base defines a pair of the openings, each end member defining a respective opening.

7. The assembly of claim 6, wherein the bridge has a V cross-section and the end members have a V cross-section with parallel legs each extending from an end of a leg of the V.

8. The assembly of claim 7, wherein the parallel legs include aligned apertures for receiving a fastener extending across the V.

9. The assembly of claim 8, wherein the apertures are on a portion of the leg spaced from a portion of the leg aligned with the opening.

10. The assembly of claim 5, wherein the assembly base includes a pair of parallel legs at each end and the legs include aligned apertures for receiving a fastener extending across the legs to secure the assembly base to the system base.

11. The assembly of claim 10, wherein the apertures are on a portion of the leg spaced from a portion of the leg aligned with the opening.

12. The assembly of claim 5, wherein the assembly roller support comprises two end walls joined by two side walls; one of the end walls includes a recess in a top edge to receive a portion of the roller; a pair of top walls each extending from a side wall and between top edges of the end walls.

13. The assembly of claim 12, wherein the side walls are truncated triangles and one of the end walls is inclined at an angle to the other end wall.

14. The assembly of claim 12, wherein each end wall includes a recess in a top edge to receive a portion of a roller.

15. The assembly of claim 5, wherein a single opening and assembly roller support are centered on the assembly base.

16. The assembly of claim 5, wherein the assembly base in cross-section is an arch of a circle.

17. The assembly of claim 16, including an arch cross-sectioned clamp to be connected to the assembly base on an opposed side of the system base to secure the assembly base to the system base.

18. The assembly of claim 5, including a fastener for securing the assembly base to the system base, the fastener including one of a bolt, cotter pin, u-bolt clamp and a band clamp.

19. A method of repairing a conveyor belt roller support system wherein the system includes at least one damaged or removed roller support integral to a system base, and wherein the system roller support is removed such as to leave a stub, the method comprising:
   positioning a replacement roller support assembly on the system base wherein an assembly roller support of the roller support assembly is aligned with a position of the stub;
   securing an assembly base of the roller support assembly to the system base; and
   attaching a roller of the conveyor belt roller support system to the assembly roller support.

20. A replacement roller support assembly for a conveyor belt roller support system wherein the system includes a plurality of rollers and a system base having a position where a roller support of the system has been damaged or removed, the assembly comprising:
   an assembly base shaped to rest on a top of the system base, the assembly base defining an opening disposed above said position when the assembly base is secured to the top of the system base;
   an assembly roller support defining a recess for engaging one of the rollers, the assembly roller support and the recess disposed above and being in alignment with said opening and said position when the assembly base is secured to the top of the system base; and
   a fastener for securing the assembly base to the system base.

21. A replacement roller support assembly for a conveyor belt roller support system wherein the system includes a plurality of rollers and system base having a position where a roller support has been damaged or removed, the assembly comprising:
   an assembly base shaped to rest on a top of the system base, the assembly base defining an opening disposed above and aligned with said position when the assembly base is secured to the top of the system base;
   an assembly roller support disposed on the assembly base defining a recess for engaging one of the rollers above said system base, the assembly roller support and recess configured to align with said opening and said position above said system base when the assembly base is secured to the system base, the assembly roller support including parallel legs defining aligned apertures; and
   a fastener receivable by the aligned apertures for securing the assembly base to the system base.

* * * * *